United States Patent
Ryu et al.

(10) Patent No.: US 9,879,619 B2
(45) Date of Patent: Jan. 30, 2018

(54) SYSTEM AND METHOD FOR CONTROLLING OF VALVE TIMING OF CONTINUOUS VARIABLE VALVE DURATION ENGINE

(71) Applicant: Hyundai Motor Company, Seoul (KR)

(72) Inventors: In Sang Ryu, Incheon (KR); Kyoung Pyo Ha, Gyeonggi-do (KR); You Sang Son, Gyeonggi-do (KR); Kiyoung Kwon, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/267,822

(22) Filed: Sep. 16, 2016

(65) Prior Publication Data

US 2017/0167396 A1 Jun. 15, 2017

(30) Foreign Application Priority Data

Dec. 10, 2015 (KR) .................. 10-2015-0176334

(51) Int. Cl.
| | | |
|---|---|---|
| *F02D 13/04* | (2006.01) | |
| *F02D 41/00* | (2006.01) | |
| *F02D 13/02* | (2006.01) | |

(52) U.S. Cl.
CPC ..... *F02D 41/0002* (2013.01); *F02D 13/0215* (2013.01); *F02D 13/0261* (2013.01);
(Continued)

(58) Field of Classification Search
CPC ............ F02D 13/0207; F02D 13/0242; F02D 13/0246; F02D 2041/001; F02D 9/04; F02D 13/0226; F02D 13/0257; F02D 13/0261; F02D 13/0284; F02D 13/023; F01L 13/065; F01L 13/0015
(Continued)

(56) References Cited

U.S. PATENT DOCUMENTS

2017/0167318 A1* 6/2017 Ryu .................... F01L 13/0015
2017/0167393 A1* 6/2017 Ryu ........................ F02D 41/26
(Continued)

FOREIGN PATENT DOCUMENTS

| JP | 2006-046293 A | 2/2006 |
|---|---|---|
| JP | 2006-336659 A | 12/2006 |
| WO | 2013-171830 A1 | 11/2013 |

*Primary Examiner* — John Kwon
(74) *Attorney, Agent, or Firm* — Brinks Gilson & Lione

(57) ABSTRACT

A system and a method for controlling valve timing of a continuous variable valve duration engine including classifying control regions depending on engine speed and load; applying a maximum duration to an intake valve and a long duration to an exhaust valve and limiting an overlap; applying the maximum duration to the intake valve and the long duration to the exhaust valve, and adjusting the overlap according to the engine load; applying the long duration to the exhaust valve, fixing an exhaust valve open timing and an exhaust valve close timing, and advancing an intake valve close timing according to an increase of engine load; controlling a wide open throttle valve and applying a short duration to the exhaust valve; and controlling a wide open throttle valve, applying the long duration to the exhaust valve, delaying the intake valve close timing according to an increased engine speed.

8 Claims, 6 Drawing Sheets

(52) U.S. Cl.
CPC .. *F02D 2041/002* (2013.01); *F02D 2200/101* (2013.01); *F02D 2200/1002* (2013.01)

(58) Field of Classification Search
USPC .................................. 123/321–323, 345–348
See application file for complete search history.

(56) References Cited

U.S. PATENT DOCUMENTS

| | | | |
|---|---|---|---|
| 2017/0167394 A1* | 6/2017 | Ryu | .................... F02D 13/0215 |
| 2017/0167396 A1* | 6/2017 | Ryu | .................... F02D 41/0002 |
| 2017/0167399 A1* | 6/2017 | Ryu | .................... F02D 13/0215 |
| 2017/0167401 A1* | 6/2017 | Ryu | .......................... F01L 1/34 |
| 2017/0167402 A1* | 6/2017 | Ryu | ...................... B60W 20/10 |
| 2017/0167403 A1* | 6/2017 | Ryu | ...................... B60W 10/06 |
| 2017/0167404 A1* | 6/2017 | Ryu | .................... F02D 13/0215 |
| 2017/0167405 A1* | 6/2017 | Ryu | .................... F01L 13/0015 |
| 2017/0167406 A1* | 6/2017 | Ryu | .......................... F01L 1/34 |
| 2017/0234243 A1* | 8/2017 | Ryu | .................... F02D 13/0207 |
| | | | 123/350 |

* cited by examiner

SYSTEM AND METHOD FOR CONTROLLING OF VALVE TIMING OF CONTINUOUS VARIABLE VALVE DURATION ENGINE

CROSS-REFERENCE TO RELATED APPLICATION

This application claims priority to and the benefit of Korean Patent Application No. 10-2015-0176334 filed on Dec. 10, 2015, the entirety of which is hereby incorporated by reference.

FIELD

The present disclosure relates to a system and a method for controlling valve timing of a continuous variable valve duration engine. present disclosure

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a cylinder by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) are controlled according to a rotational speed of an engine. Therefore, a continuous variable valve duration (CVVD) device controlling the opening time of an intake valve and an exhaust valve of the engine and a continuous variable valve timing (CVVT) device controlling the opening and closing timing of the intake valve and the exhaust valve of the engine have been developed.

The CVVD device adjusts duration of the valve by controlling an open time of the valve. In addition, the CVVT device advances or delays opening and closing timing of the valve in a state of fixing the open time of the valve. That is, if the opening timing of the valve is determined, the closing timing is automatically determined according to the open duration of the valve.

However, since both the CVVD device and the CVVT device are used in the engine, the duration and timing of the valve should be simultaneously controlled.

The above information disclosed in this Background section is only for enhancement of understanding of the background of the invention and therefore it may contain information that does not form the prior art that is already known in this country to a person of ordinary skill in the art.

SUMMARY

The present disclosure provides a system and a method for controlling valve timing of a continuous variable valve duration engine simultaneously controls duration and timing of the continuous variable valve by independently controlling opening and closing timing of an intake valve and an exhaust valve by mounting a continuous variable valve duration device and a continuous variable valve timing device on an intake and mounting a two stage variable valve duration device and a continuous variable valve timing device on an exhaust.

An embodiment of the present disclosure provides a method for controlling valve timing of a continuous variable valve duration engine provided with a continuous variable valve duration (CVVD) device and a continuous variable valve timing (CVVT) device at an intake and a two stage variable valve duration device (VVD) and the continuous variable valve timing (CVVT) device at an exhaust that may include: classifying as a plurality of control regions depending on an engine speed and an engine load; applying a maximum duration to an intake valve and a long duration to an exhaust valve and limiting an overlap in a first control region; applying the maximum duration to the intake valve and the long duration to the exhaust valve, and adjusting the overlap according to the engine load in a second control region; applying the long duration to the exhaust valve, fixing an exhaust valve open (EVO) timing and an exhaust valve close (EVC) timing, and advancing an intake valve close (IVC) timing according to an increase of the engine load in a third control region; controlling a wide open throttle valve (WOT) and applying a short duration to the exhaust valve in a fourth control region; and controlling a wide open throttle valve (WOT), applying the long duration to the exhaust valve, delaying the intake valve close (IVC) timing according to an increase of the engine speed in a fifth control region.

The overlap may be limited by fixing an intake valve open (IVO) timing and the IVC timing, and setting an exhaust valve close (EVC) timing as a maximum value to maintain combustion stability in the first control region.

The overlap may be increased by delaying the EVC timing until the engine load reaches a predetermined load and may be reduced by advancing the EVC timing when the engine load is increased more than the predetermined load in the second control region.

The method may further include controlling the EVO timing close to bottom dead center in the fourth control region.

Another embodiment of the present disclosure provides a system for controlling valve timing of a continuous variable valve duration engine that may include: a data detector detecting data related to a running state of the vehicle; a camshaft position sensor detecting a position of a camshaft; an intake continuous variable valve duration (CVVD) device controlling an opening time of an intake valve of the engine; an exhaust two stage variable valve duration (VVD) device controlling an opening time of an exhaust valve of the engine by two different durations; an intake continuous variable valve timing (CVVT) device controlling an opening and closing timing of the intake valve of the engine; an exhaust continuous variable valve timing (CVVT) device controlling an opening and closing timing of the exhaust valve of the engine; and a controller configured to classify as a plurality of control regions depending on an engine speed and an engine load based on signals from the data detector and camshaft position sensor and control the intake CVVD device, the exhaust two stage VVD device, intake CVVT device and the exhaust CVVT according to the control region, wherein the controller applies a maximum duration to an intake valve and a long duration to an exhaust valve and limits an overlap in a first control region, applies the maximum duration to the intake valve and the long duration to the exhaust valve and adjusts the overlap according to the engine load in a second control region, applies the long duration to the exhaust valve, fixes an exhaust valve open (EVO) timing and an exhaust valve close (EVC) timing, and advances an intake valve close (IVC) timing according to an increase of the engine load in a third control region, controls a wide open throttle valve (WOT) and applies a short duration to the exhaust valve in a fourth control region, and controls a wide open throttle valve (WOT), applies the long duration to the exhaust valve and delays the intake valve close (IVC) timing according to an increase of the engine speed in a fifth control region.

The controller may limit the overlap by fixing an intake valve open (IVO) timing and the IVC timing, and setting an exhaust valve close (EVC) timing as a maximum value to maintain combustion stability in the first control region.

The controller may increase the overlap by delaying the EVC timing until the engine load reaches a predetermined load and may reduce the overlap by advancing the EVC timing when the engine load is increased more than the predetermined load in the second control region.

The controller may control the EVO timing close to bottom dead center in the fourth control region.

As described above, according to an embodiment of the present disclosure, duration and timing of the continuous variable valve are simultaneously controlled, so the engine may be controlled under improved conditions.

That is, opening timing and closing timing of the intake valve and the exhaust valve are controlled, thereby improving fuel efficiency under a partial load condition and power performance under a high load condition.

In addition, a starting fuel amount may be reduced by increasing a valid compression ratio, and exhaust gas may be reduced by shortening time for heating a catalyst.

In addition, and a two stage variable valve device is used at the exhaust, thereby reducing manufacturing cost while maintaining power performance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, references being made to the accompanying drawings, in which.

Figure 1:
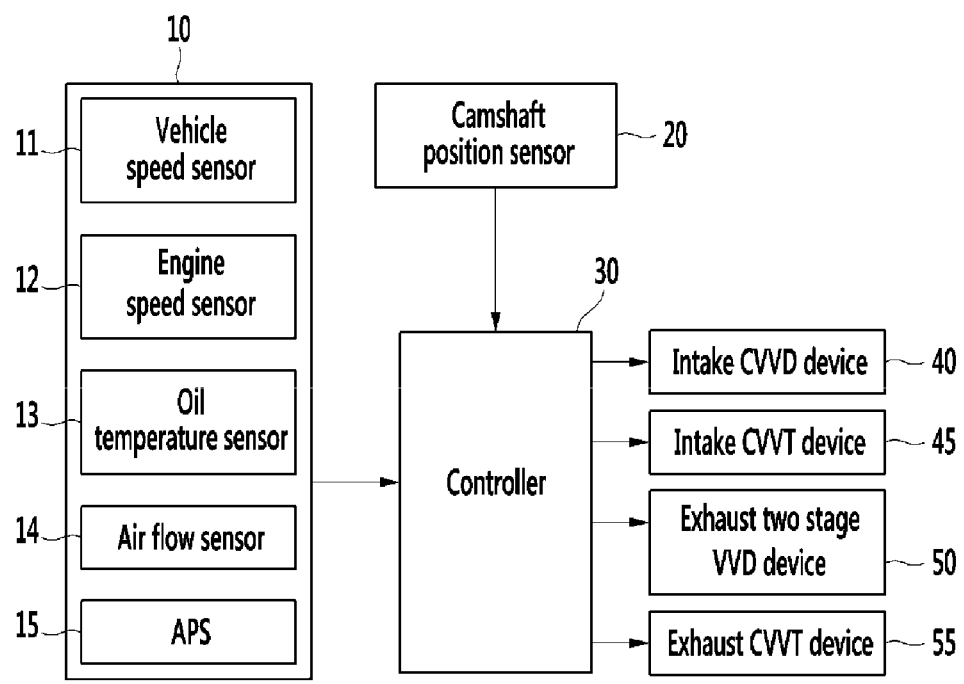
FIG. 1 is a schematic block diagram showing a system for controlling valve timing of a continuous variable valve duration engine according to an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain embodiments of the present disclosure have been shown and described, simply by way of illustration. As those skilled in the art would realize, the described embodiments may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An embodiment of the present disclosure will hereinafter be described in detail with reference to the accompanying drawings.

FIG. 1 is a schematic block diagram showing a system for controlling valve timing of a continuous variable valve duration engine according to an embodiment of the present disclosure.

As shown in FIG. 1, a system for controlling valve timing of a continuous variable valve duration engine according to an embodiment of the present disclosure includes a data detector 10, a camshaft position sensor 20, a controller 30, an intake continuous variable valve duration (CVVD) device 40, an intake continuous variable valve timing (CVVT) device 45, an exhaust two stage variable valve duration (VVD) device 50, and an exhaust continuous variable valve timing (CVVT) device 55.

The data detector 10 detects data related to a running state of the vehicle for controlling the CVVD devices and the CVVT devices, and includes a vehicle speed sensor 11, an engine speed sensor 12, an oil temperature sensor 13, an air flow sensor 14, and an accelerator pedal position sensor 15.

The vehicle speed sensor 11 detects a vehicle speed, transmits a corresponding signal to the controller 30, and is mounted at a wheel of the vehicle.

The engine speed sensor 12 detects a rotation speed of the engine from a change in phase of a crankshaft or a camshaft, and transmits a corresponding signal to the controller 30.

The oil temperature sensor (OTS) 13 detects temperature of oil flowing through an oil control valve (OCV), and transmits a corresponding signal to the controller 30.

The oil temperature detected by the oil temperature sensor 13 may be measured by determining a coolant temperature by using a coolant temperature sensor mounted at a coolant passage of an intake manifold. Therefore, in this specification and the scope of the appended claims, the oil temperature sensor 13 may include a coolant temperature sensor, and the oil temperature should be understood to include the coolant temperature.

The air flow sensor 14 detects an air amount drawn into the intake manifold, and transmits a corresponding signal to the controller 30.

The accelerator pedal position sensor 15 detects a degree at which a driver pushes an accelerator pedal, and transmits a corresponding signal to the controller 30. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake pipe may be used instead of the accelerator pedal position sensor 15. Therefore, in this specification and the scope of the appended claims, the accelerator pedal position sensor 15 may include a throttle valve position sensor, and the position value of the accelerator pedal should be understood to include an opening value of the throttle valve.

The camshaft position sensor 20 detects a change of a camshaft angle, and transmits a corresponding signal to the controller 30.

Figure 2:
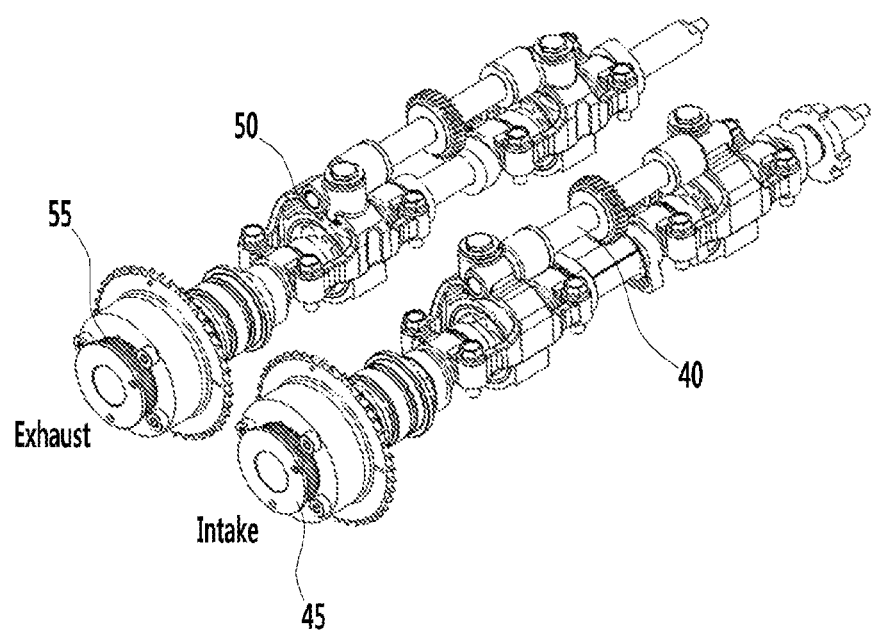
FIG. 2 is a perspective view showing an intake provided with a continuous variable valve duration device and a continuous variable valve timing device and an exhaust provided with a two stage variable valve duration device and a continuous variable valve timing device according to an embodiment of the present disclosure.

FIG. 2 is a perspective view showing an intake provided with a continuous variable valve duration device 40 and a continuous variable valve timing device 45 and an exhaust provided with a two stage variable valve duration device 50 and a continuous variable valve timing device 55 according to an embodiment of the present disclosure.

The intake continuous variable valve duration (CVVD) device 40 controls an opening time of an intake valve of the engine according to a signal from the controller 30, and the exhaust two stage variable valve duration (VVD) device 50 controls an opening time of an exhaust valve of the engine according to a signal from the controller 30.

The exhaust two stage variable valve duration (VVD) device controls an opening time of an exhaust valve of the engine by switching two different durations according to a signal from the controller 30. That is, the exhaust two stage VVD device 50 can replace an exhaust CVVD device and corresponding sensor thereby reducing manufacturing costs.

If exhaust duration becomes long, high speed performance and fuel efficiency may be improved, however low speed performance may be deteriorated. Thus, a short duration for low speed performance and a long duration for high speed performance may be determined through a predetermined test. For example, the short duration may be determined at an angle of 180-210 degrees, and the long duration may be determined at an angle of 240-250 degrees.

Accordingly, the exhaust two stage VVD device 50 may apply the short duration and the long duration to the exhaust valve by switching.

The exhaust continuous variable valve timing (CVVT) device 55 controls opening and closing timing of the exhaust valve of the engine according to a signal from the controller 30.

The controller 30 classifies a plurality of control regions depending on an engine speed and an engine load based on signals from the data detector and camshaft position sensor 20, and controls the intake CVVD device 40, the intake CVVT device 45, the exhaust two stage VVD device 50, and the exhaust CVVT device 55 according to the control region. Herein, the plurality of control regions may be classified into five regions.

The controller 30 applies a maximum duration to an intake valve and a long duration to an exhaust valve and limits an overlap in a first control region, applies the maximum duration to the intake valve and the long duration to the exhaust valve and adjusts he overlap according to the engine load in a second control region, applies the long duration to the exhaust valve, fixes an exhaust valve open (EVO) timing and an exhaust valve close (EVC) timing, and advances an intake valve close (IVC) timing according to an increase of the engine load in a third control region, controls a wide open throttle valve (WOT) and applies a short duration to the exhaust valve in a fourth control region, and controls a wide open throttle valve (WOT), applies the long duration to the exhaust valve and delays the intake valve close (IVC) timing according to an increase of the engine speed in a fifth control region.

For these purposes, the controller 30 may be implemented as at least one processor that is operated by a predetermined program, and the predetermined program may be programmed in order to perform each step of a method for controlling valve timing of a continuous variable valve duration engine according to an embodiment of the present disclosure.

Various embodiments described herein may be implemented within a recording medium that may be read by a computer or a similar device by using software, hardware, or a combination thereof, for example.

The hardware of the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

The software such as procedures and functions of the embodiments described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to an embodiment of the present disclosure will be described in detail with reference to FIG. 3A to FIG. 5.

Figure 3A:
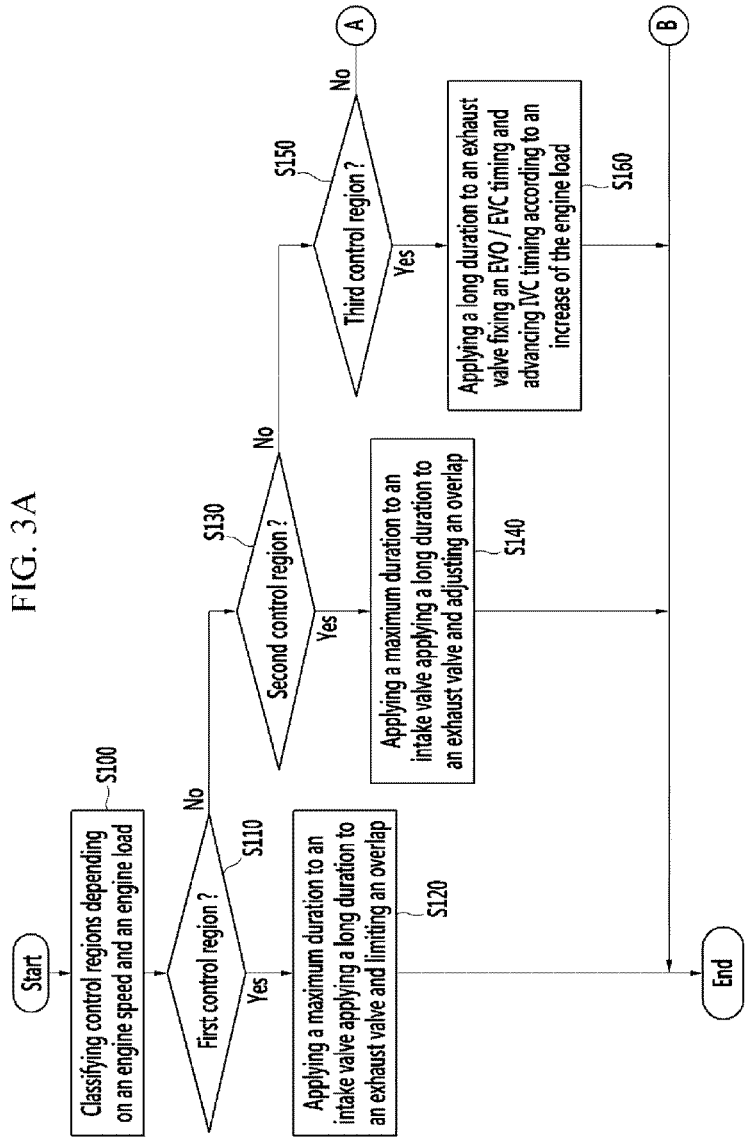
FIGS. 3A and 3B are flowcharts showing a method for controlling valve timing of a continuous variable valve duration engine according to an embodiment of the present disclosure.
Figure 3B:
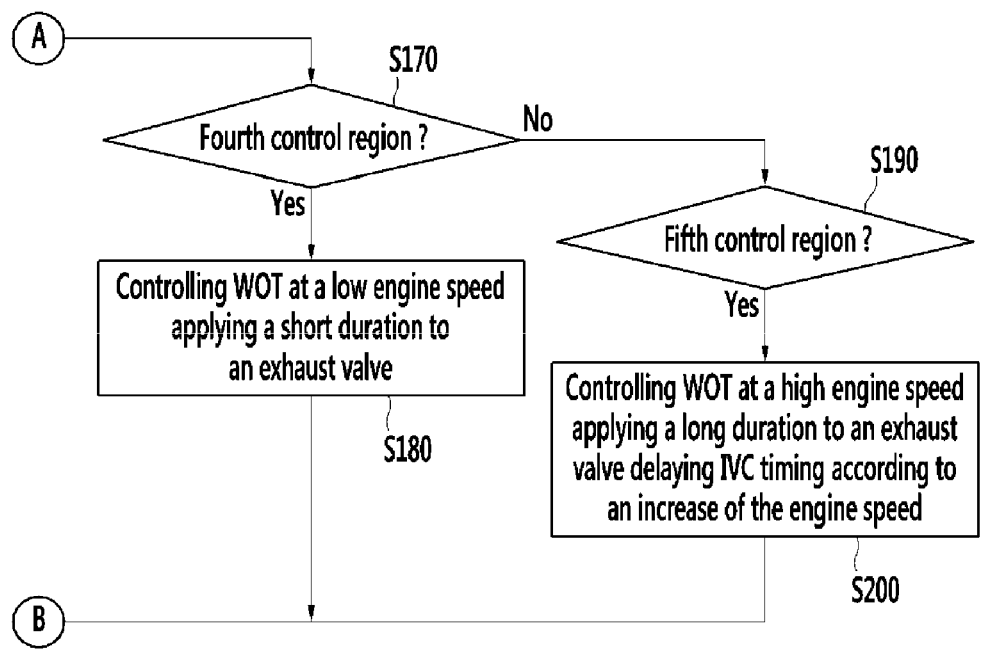

FIG. 3A and 3B are flowcharts showing a method for controlling valve timing of a continuous variable valve duration engine according to an embodiment of the present disclosure. In addition, FIG. 4 is a graph showing duration, opening timing, and closing timing of an intake valve depending on an engine load and an engine speed according to an embodiment of the present disclosure, and FIG. 5 is a graph showing duration, opening timing, and closing timing of an exhaust valve depending on an engine load and an engine speed according to an embodiment of the present disclosure.

Figure 4:
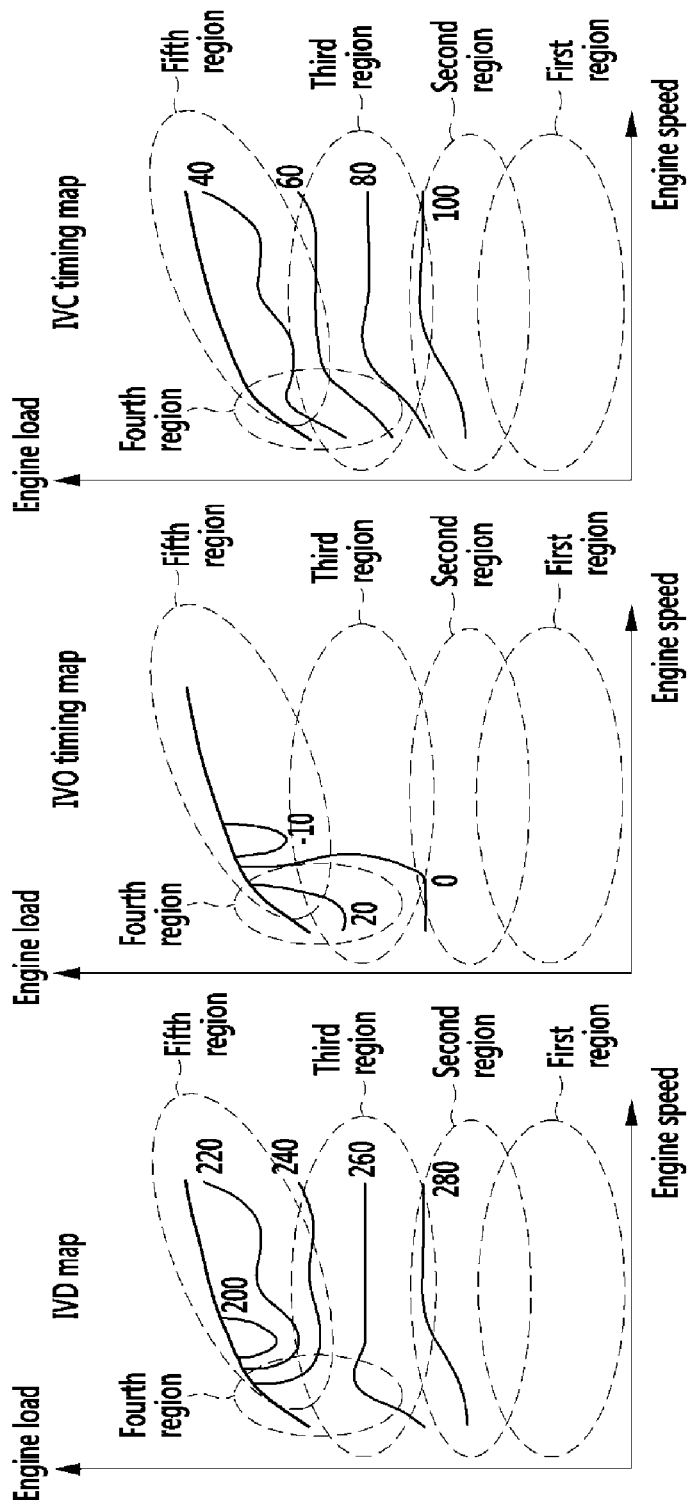
FIG. 4 is a graph showing duration, opening timing, and closing timing of an intake valve depending on an engine load and an engine speed according to an embodiment of the present disclosure.
Figure 5:
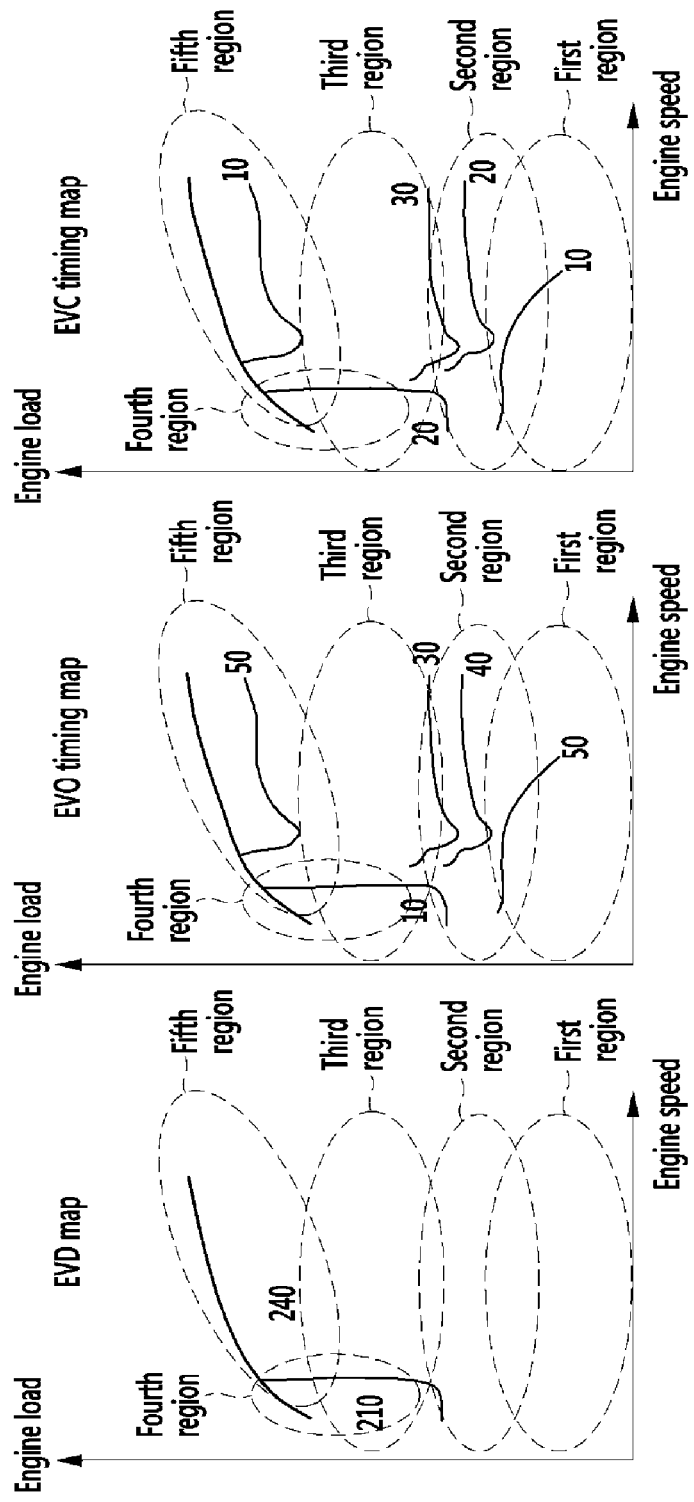
FIG. 5 is a graph showing duration, opening timing, and closing timing of an exhaust valve depending on an engine load and an engine speed according to an embodiment of the present disclosure.

In the FIG. 4 and FIG. 5, an IVD map and an EVD map indicate a crank angle, an IVO timing map indicates an angle before top dead center, an IVC timing map indicates an angle after bottom dead center, an EVO timing map indicates an angle before bottom dead center, and an EVC timing map indicates an angle after top dead center.

As shown in FIGS. 3A and 3B, a method for controlling valve timing of a continuous variable valve duration engine according to an embodiment of the present disclosure starts with classifying a plurality of control regions depending on an engine speed and an engine load by the controller 30 at step S100.

The controller 30 may classify control regions as a first control region when the engine load is less than a first predetermined load, a second control region when the engine load is greater than or equal to the first predetermined load and less than a second predetermined load, and a third control region when the engine load is greater than or equal to the second predetermined load and less than a third predetermined load. In addition, the controller 30 may classify control regions as a fourth region when the engine load is greater than or equal to the second predetermined load and the engine speed is less than a predetermined speed, and a fifth region when the engine load is greater than or equal to the third predetermined load and the engine speed is greater than or equal to a predetermined speed.

When the control regions are classified according to the engine load and the engine speed at the step S100, the controller 30 determines whether a current engine state belongs to the first control region at step S110.

When the current engine state belongs to the first control region at the step S110, the controller 30 applies a maximum duration to the intake valve and a long duration to the exhaust valve and limits an overlap at step S120.

That is, the controller 30 may limit the overlap by fixing the IVO timing and the IVC timing and setting the EVC timing as a maximum value to maintain combustion stability.

At this time, as shown in FIG. 4, the IVO timing may be fixed at an angle before top dead center of 0-10 degrees, and the IVC timing may be fixed at an angle after bottom dead center of 100-110 degrees.

When the current engine state does not belong to the first control region at the step S110, the controller 30 determines whether the current engine state belongs to the second control region at step S130.

When the current engine state belongs to the second control region at the step S130, the controller 30 applies the maximum duration to the intake valve and the long duration to the exhaust valve, and adjusts the overlap according to the engine load at step S140.

The controller 30 may increase the overlap by delaying the EVC timing in a direction after top dead center until the engine load reaches a predetermined load.

Herein, if the EVC timing is controlled after top dead center, intake pumping may be decreased according to the overlap, however, exhaust pumping may be increased as the EVO timing approaches bottom dead center. Thus, the controller 30 may reduce the overlap by advancing the EVC timing toward a locking position when the engine load is increased more than the predetermined load.

In addition, the controller 30 may apply the maximum duration to the intake valve to prevent or reduce knocking according to an increase of the engine load and maintaining a late intake valve close (LIVC) position.

When the current engine state does not belong to the second control region at the step S130, the controller 30 determines whether the current engine state belongs to the third control region at step S150.

When the current engine state belongs to the third control region at the step S150, the controller 30 applies the long duration to the exhaust valve, fixes the EVO timing and the EVC timing, and advances the IVC timing according to an increase of the engine load at step S160.

At this time, the controller 30 may fix the exhaust CVVT device at the locking position by fixing the EVO timing and the EVC timing.

With reference to FIG. 5, the long duration is applied to the exhaust in the second and third control regions, so the long duration may be determined as an angle of 240-250 degrees to decrease exhaust pumping and increase the overlap.

When the current engine state does not belong to the third control region at the step S150, the controller 30 determines whether the current engine state belongs to the fourth control region at step S170.

When the current engine state belongs to the fourth control region at the step S170, the controller 30 fully opens a throttle valve, and applies the short duration to the exhaust valve at step S180.

In the fourth control region, the controller 30 generates a scavenging phenomenon which decreases an exhaust pressure and emits combustion gas by using the exhaust interference reduction because the exhaust pressure is low as the engine speed is less than the predetermined speed (e.g., 1500 rpm).

The EVC timing is controlled after top dead center to generate the scavenging, and the effect of the scavenging is increased when exhaust interference is reduced by controlling the EVO timing close to bottom dead center. For this purpose, as shown in FIG. 5, the controller 30 may apply the short duration instead of the long duration to the exhaust valve. With reference to a switching line as shown in FIG. 5, the left side of the drawing is a region to which the short duration is applied, and the right side of the drawing is a region to which the long duration is applied.

When the current engine state does not belong to the fourth control region at the step S170, the controller 30 determines whether the current engine state belongs to the fifth control region at step S190.

When the current engine state belongs to the fifth control region at the step S190, the controller 30 fully opens a throttle valve, applies the long duration to the exhaust valve, and delays the IVC timing according to an increase of the engine speed at step S200.

For example, if the throttle valve is fully opened in the fifth control region when the engine speed is greater than or equal to the predetermined speed (e.g., 1500 rpm), the long duration of the exhaust increases exhaust pumping as the scavenging phenomenon is reduced. Therefore, the controller 30 may apply the long duration to the exhaust valve by switching the short duration applied in the fourth control region, and may delay the IVC timing according to an increase of the engine speed.

The IVC timing may be controlled at an angle of 20 degrees after bottom dead center at a low engine speed that is less than the predetermined speed. At an engine speed equal to or greater than the predetermined speed, IVC timing may be delayed at an angle of 60 degrees after bottom dead center as the engine speed is increased with reference to FIG. 4.

Simultaneously, the controller 30 may generate an under-lap by delaying the IVO timing within a middle engine speed (e.g., 1500-3000 rpm). The IVO timing may be controlled above an angle of 10 degrees after top dead center as shown in FIG. 4.

As described above, according to an embodiment of the present disclosure, duration and timing of the continuous variable valve are simultaneously controlled, so the engine may be controlled under improved conditions.

That is, opening timing and closing timing of the intake valve and the exhaust valve are optimally controlled, thereby improving fuel efficiency under a partial load condition and power performance under a high load condition. In addition, a starting fuel amount may be reduced by increasing a valid compression ratio, and exhaust gas may be reduced by shortening time for heating a catalyst.

In addition, the two stage variable valve device is used at the exhaust, thereby reducing manufacturing cost while maintaining power performance.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling valve timing of an engine provided with a continuous variable valve duration (CVVD) device and a continuous variable valve timing (CVVT) device at an intake and a two stage variable valve duration device (VVD) and the continuous variable valve timing (CVVT) device at an exhaust, comprising:
   classifying a plurality of control regions depending on an engine speed and an engine load;
   applying a maximum duration to an intake valve and a long duration to an exhaust valve and limiting an overlap in a first control region;
   applying the maximum duration to the intake valve and the long duration to the exhaust valve, and adjusting the overlap according to the engine load in a second control region;
   applying the long duration to the exhaust valve, fixing an exhaust valve open (EVO) timing and an exhaust valve close (EVC) timing, and advancing an intake valve close (IVC) timing according to an increase of the engine load in a third control region;
   controlling a wide open throttle valve (WOT) and applying a short duration to the exhaust valve in a fourth control region; and
   controlling the wide open throttle valve (WOT), applying the long duration to the exhaust valve, and delaying the intake valve close (IVC) timing according to an increase of the engine speed in a fifth control region.

2. The method of claim 1, wherein the overlap is limited by fixing an intake valve open (IVO) timing and the IVC timing, and setting an exhaust valve close (EVC) timing as a maximum value to maintain combustion stability in the first control region.

3. The method of claim 1, wherein the overlap is increased by delaying the EVC timing until the engine load reaches a predetermined load and is reduced by advancing the EVC timing when the engine load is increased more than the predetermined load in the second control region.

4. The method of claim 1, further comprising:
   controlling the EVO timing close to bottom dead center in the fourth control region.

5. A system for controlling valve timing of a continuous variable valve duration engine, comprising:
   a data detector for detecting data related to a running state of a vehicle;
   a camshaft position sensor for detecting a position of a camshaft;
   an intake continuous variable valve duration (CVVD) device for controlling an opening time of an intake valve of the engine;
   an exhaust two stage variable valve duration (VVD) device for controlling an opening time of an exhaust valve of the engine by one of and short duration and a long duration;
   an intake continuous variable valve timing (CVVT) device for controlling an opening and closing timing of the intake valve of the engine;
   an exhaust continuous variable valve timing (CVVT) device for controlling an opening and closing timing of the exhaust valve of the engine; and
   a controller configured to classify a plurality of control regions depending on an engine speed and an engine load based on signals from the data detector and the camshaft position sensor and to control the intake CVVD device, the exhaust two stage VVD device, the intake CVVT device and the exhaust CVVT according to the control region,
   wherein the controller applies a maximum duration to the intake valve and the long duration to the exhaust valve and limits an overlap in a first control region, applies a maximum duration to the intake valve and the long duration to the exhaust valve and adjusts the overlap according to the engine load in a second control region, applies the long duration to the exhaust valve, fixes an exhaust valve open (EVO) timing and an exhaust valve close (EVC) timing, and advances an intake valve close (IVC) timing according to an increase of the engine load in a third control region, controls a wide open throttle valve (WOT) and applies the short duration to the exhaust valve in a fourth control region, and controls the wide open throttle valve (WOT), applies the long duration to the exhaust valve and delays the intake valve close (IVC) timing according to an increase of the engine speed in a fifth control region.

6. The system of claim 5, wherein the controller limits the overlap by fixing an intake valve open (IVO) timing and the IVC timing, and setting the exhaust valve close (EVC) timing to an EVC maximum value to maintain combustion stability in the first control region.

7. The system of claim 5, wherein the controller increases the overlap by delaying the EVC timing until the engine load reaches a predetermined load and reduces the overlap by advancing the EVC timing when the engine load is increased above the predetermined load in the second control region.

8. The system of claim 5, wherein the controller controls the EVO timing close to bottom dead center in the fourth control region.

\* \* \* \* \*